(12) United States Patent
Bes et al.

(10) Patent No.: US 7,269,620 B2
(45) Date of Patent: Sep. 11, 2007

(54) DEVICE AND METHOD FOR EXCHANGING FLOWS BETWEEN A CLIENT DEVICE AND A SERVER

(75) Inventors: Cyril Bes, Ifs (FR); Ivan Lovric, Lunel (FR); Eric Maschio-Esposito, Fontaine Etoupefour (FR)

(73) Assignee: France Telecom, Paris ( * ) Notice: Subject to any disclaimer, the term of this patent is extended or adjusted under 35 U.S.C. 154(b) by 632 days.

(21) Appl. No.: 10/473,984

(22) PCT Filed: Mar. 26, 2002

(86) PCT No.: PCT/FR02/01044

§ 371 (c)(1),
(2), (4) Date: Feb. 5, 2004

(87) PCT Pub. No.: WO02/080024

PCT Pub. Date: Oct. 10, 2002

(65) Prior Publication Data

US 2006/0080674 A1    Apr. 13, 2006

(30) Foreign Application Priority Data

Mar. 30, 2001 (FR) .................................. 01 04398

(51) Int. Cl.
*G06F 15/16* (2006.01)

(52) U.S. Cl. ...................... 709/203; 709/219; 709/223; 709/228; 709/230; 709/246

(58) Field of Classification Search ................ 709/203, 709/219, 223, 230, 246, 228
See application file for complete search history.

(56) References Cited

U.S. PATENT DOCUMENTS 6,704,726 B1 *   3/2004   Amouroux ..................... 707/4

FOREIGN PATENT DOCUMENTS

WO       WO98/43177       10/1998

OTHER PUBLICATIONS

Elson Jeremy, "ICAP the Internet Content Adaptation Protocol", The ICAP Protocol Group, Internet-Draft, pp. 1-31, Feb. 2000.*
PCT Rapport D'Examin Preliminaire International, Mar. 30, 2001, PCT/FR02/01044.
International Search Report, Jun. 19, 2002, WO 98 43177.

* cited by examiner

*Primary Examiner*—Michael Y. Won
(74) *Attorney, Agent, or Firm*—Fish & Richardson P.C.; Richard P. Gilly

(57) ABSTRACT

The invention concerns a device for data flow exchange between a client device (3) provided with an Internet file and a server (4) adapted to provide on request from the client device (3), at least a service for transforming said file, the communication between the client (3) and the server (4) being based on a protocol of adaptation of Internet file content of the Internet Content Adaptation Protocol (iCAP) type. The device comprises a adaptor (5) of iCAP type data flows into files adapted to be used directly by said server (4) or by said client device (3); the adaptor (5) comprises means for communicating with the client device (3) and the server (4) and configuration file wherein is/are stated the transformation service(s).

15 Claims, 4 Drawing Sheets

FIG. 5
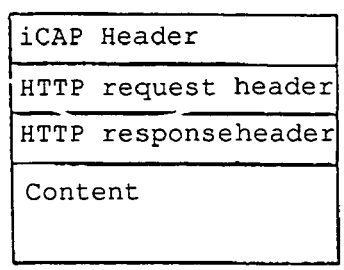
FIG. 6b
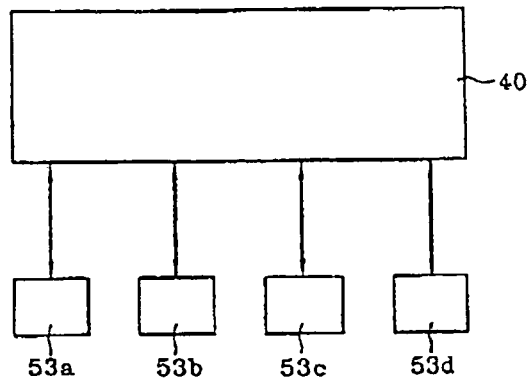
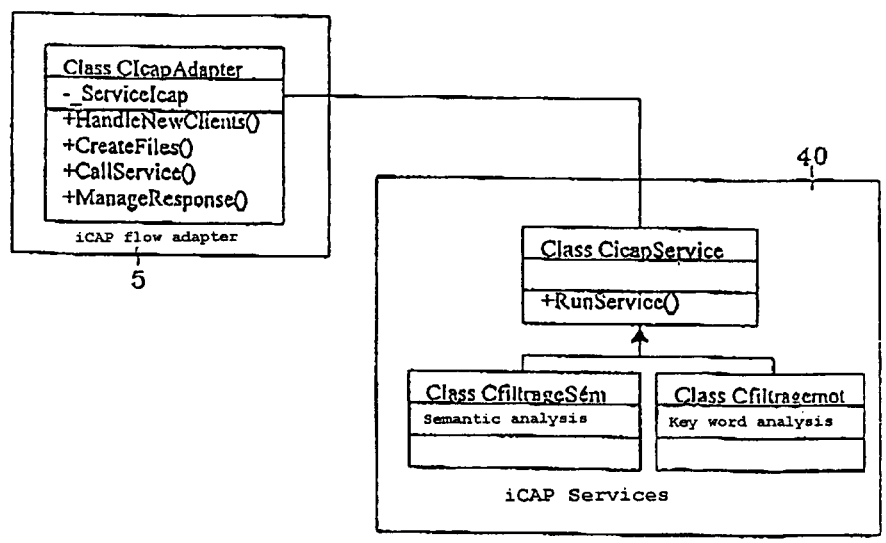
FIG. 7

DEVICE AND METHOD FOR EXCHANGING FLOWS BETWEEN A CLIENT DEVICE AND A SERVER

The present invention relates to a method for exchanging flows between a client device that has an Internet file and a server able to provide at the request of the client device a service for converting said file, communication between the client device and the server being based on an iCAP Internet file content adaptation protocol.

The field of the invention is that of communication between equipment in an Internet type telecommunication network and servers housing added value services, in the event content conversion or adaptation services.

In practice, content is presented in file form.

Communication is based on an Internet Content Adaptation Protocol defined by a group of companies in the context of the iCAP forum.

As examples of content conversion services may be cited file conversion services such as the conversion of Word documents into RTF documents, the search for viruses in a file, automatic file translation, the categorisation of content by semantic analysis returning a file corresponding to the main themes in the document, for the purpose for example of exercising parental control when licentious topics have been detected, etc.

Figure 1:
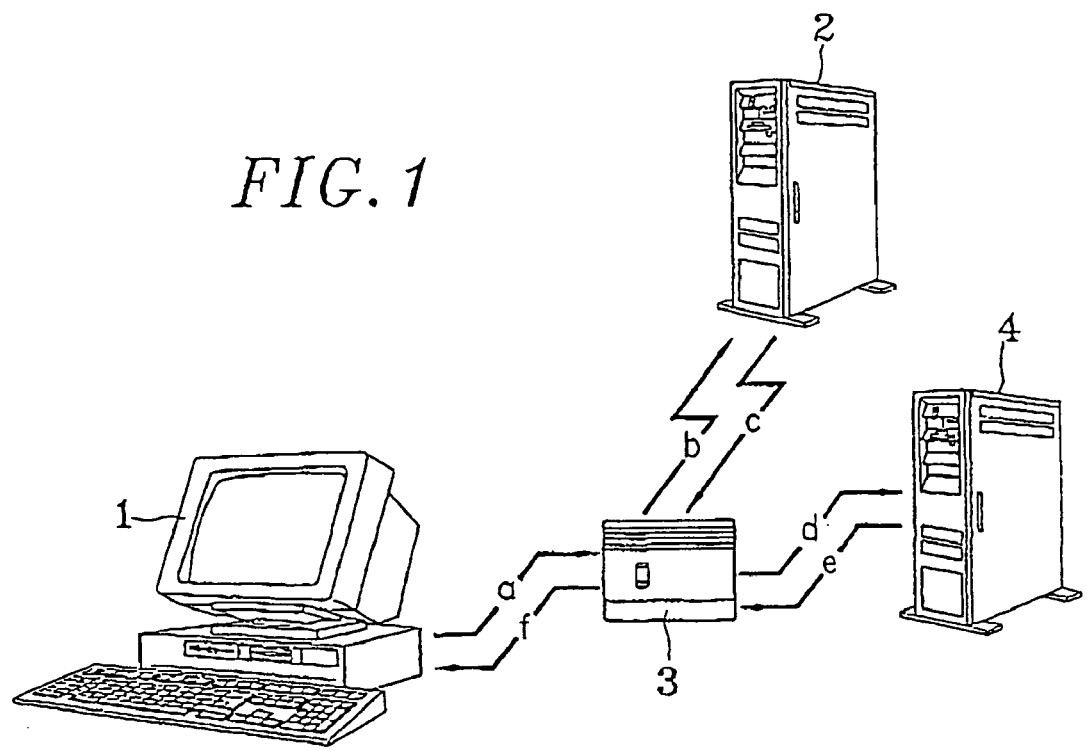

An example of content conversion in accordance with the iCAP Protocol is shown in FIG. 1:

a) an HTTP request is sent from the computer 1 of a user to a proxy cache 3 configured in the computer's browser; the computer 1 may be replaced by any other equipment able to send an HTTP request, likewise the cache 3 may be replaced by a router or by any other Internet network equipment, b) the cache 3 sends an HTTP request to the Web server 2 containing this page, c) the Web server returns the requested page to the cache 3, d) the cache 3 acting as the iCAP client device, known more straightforwardly as the iCAP client, requests a content conversion service from the iCAP Server 4, by transmitting the web page to it; the content conversion requested could also relate to the HTTP request itself and be requested directly, at the end of step a) or at the end of step c), in other words after the HTTP response has been sent; in the remainder of the document the term Internet file will be used to denote an HTTP response comprising one or more headers and a content, or an HTTP request not generally comprising content but comprising at least one header;

e) the iCAP Server 4 processes this request by implementing the requested file conversion service then responds to the cache 3 by returning the converted file, for example the processed page, f) the cache 3 returns the response of the iCAP Server 4 to the user's computer 1 and stores this response.

As shown in this example, the role of the iCAP Protocol consists in connecting an iCAP Client 3 to the iCAP Server 4.

Figure 2:
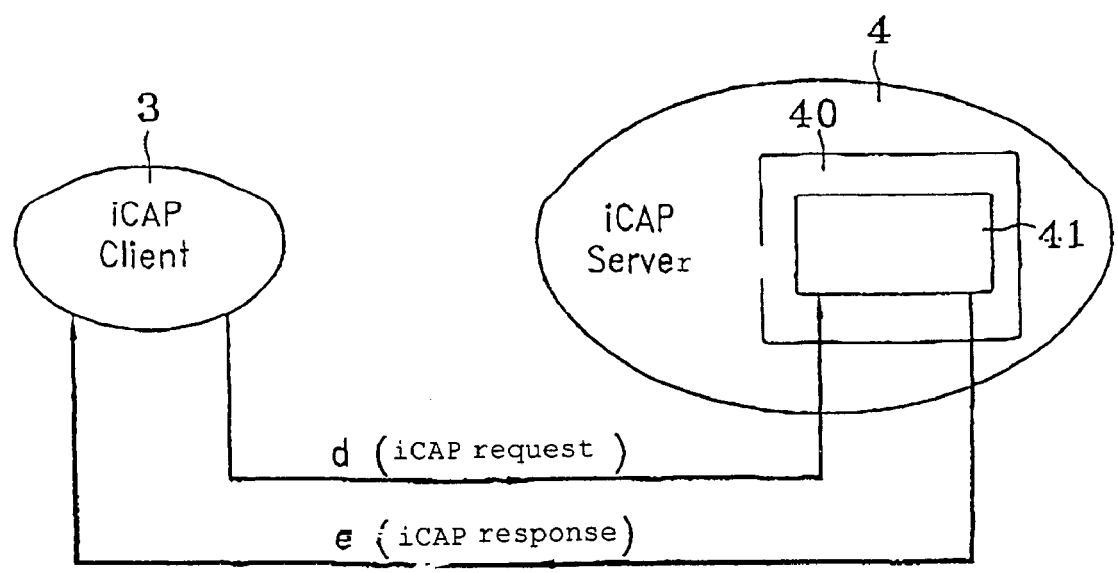

At present in order to be able to implement this iCAP Protocol between a client 3 and a server 4 corresponding to the previous steps d) and e), it is indispensable, as shown in FIG. 2, to develop a specific layer 41 within the file conversion service 40 implemented by the iCAP Server 4. This necessitates in particular a specific development for each file conversion service. Moreover these developments are cumbersome and expensive.

The purpose of the present invention is therefore to reduce or even to eliminate the specific development that is required for each service to be compatible with the iCAP protocol.

The subject of the invention is a device for exchanging flows between a client who has an Internet file and a server able to provide, at the request of the client, at least one service for converting said file, with communication between the client and the server being based on an iCAP Internet file content adaptation protocol, mainly characterised in that it comprises an adapter of iCAP flows into files able to be used directly by said server or said client; and in that the adapter includes means: for communicating with the client and the server and a configuration file in which the conversion service (or services) is (or are) declared.

The adapter comprises to advantage a communication module able to manage communication with the client and/or a module for extracting headers and content from the Internet file and/or a module for pre-analysing headers and/or a module for creating interface files between the adapter and the server and/or a module for calling up the server's adaptation service and/or a response module and/or a module for checking the integrity of the converted file intended to the client and/or a module for restoring the converted file intended for the client.

The adapter may be integrated with the server.

The invention also relates to a method for exchanging flows between a client who has an Internet file, and a server able to provide at least one file conversion service, with communication between the client and the server being based on an iCAP Internet file content adaptation protocol, characterised in that it consists in placing an adapter of iCAP flows into files able to be used between the client and the server and in that it comprises the following steps:

a—the sending of an Internet file, by said client to the adapter, b—the adaptation of the Internet file by the adapter and the sending of the adapted file to said server, c—the execution of the conversion of the adapted file, by said server and the sending of the converted file to said adapter, d—the adaptation of the converted file by the adapter e—the sending of the converted and adapted file to said client.

According to one characteristic of the invention, step b—consists for the adapter in extracting the headers and possibly the content of the Internet file provided by the client,
pre-analysing the headers,
generating interface files,
calling up the server's conversion service,
awaiting a response from the server.

Step d—consists to advantage for the adapter in
verifying the call return parameter and checking the integrity of the converted file,
when the integrity check requests it, restoring the converted file.

According to an additional characteristic, the method according to the invention comprises a previous step of initialising the adapter consisting in declaring the conversion service or services in an adapter configuration file.

Figure 3:
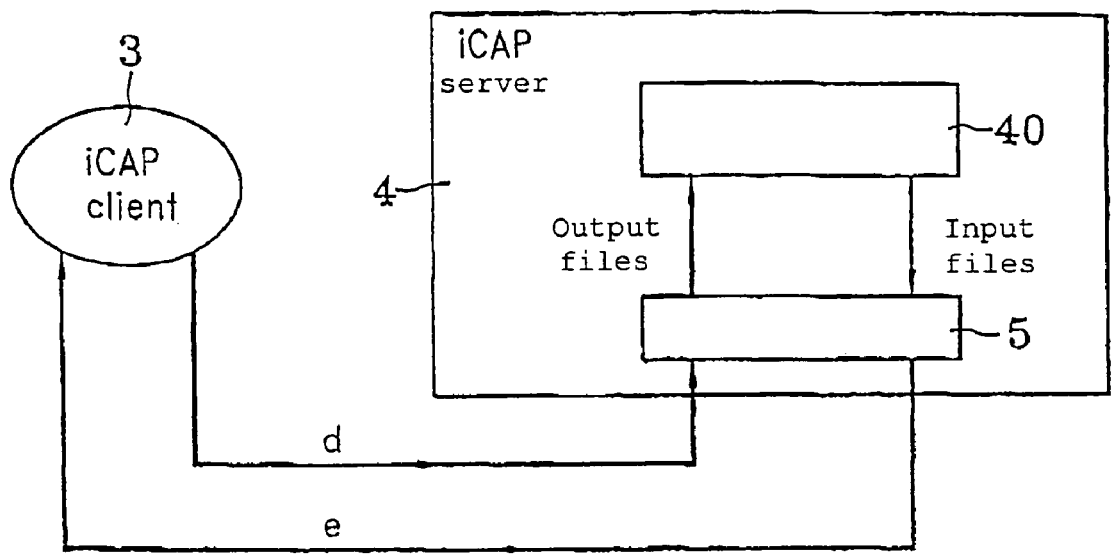
Figure 4:
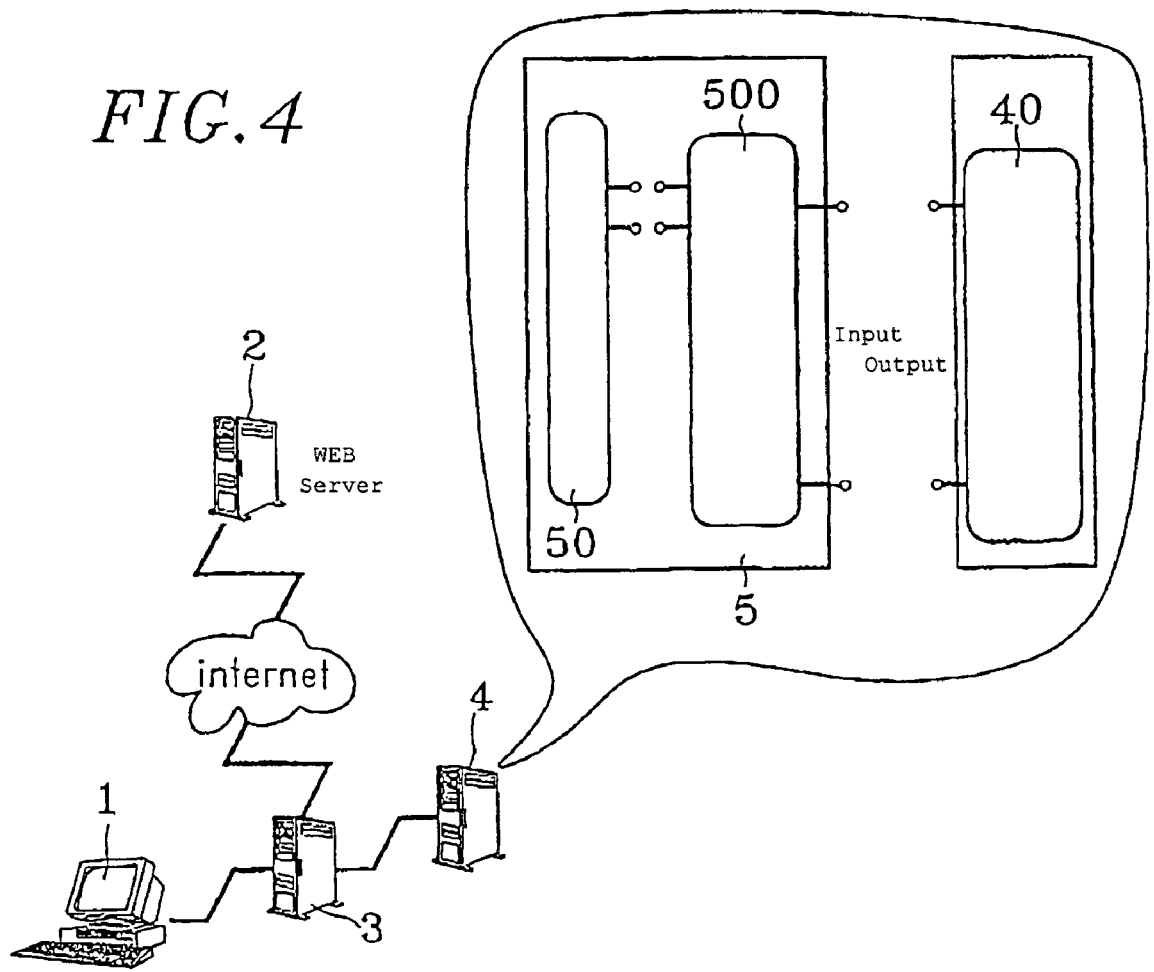
Figure 6A:
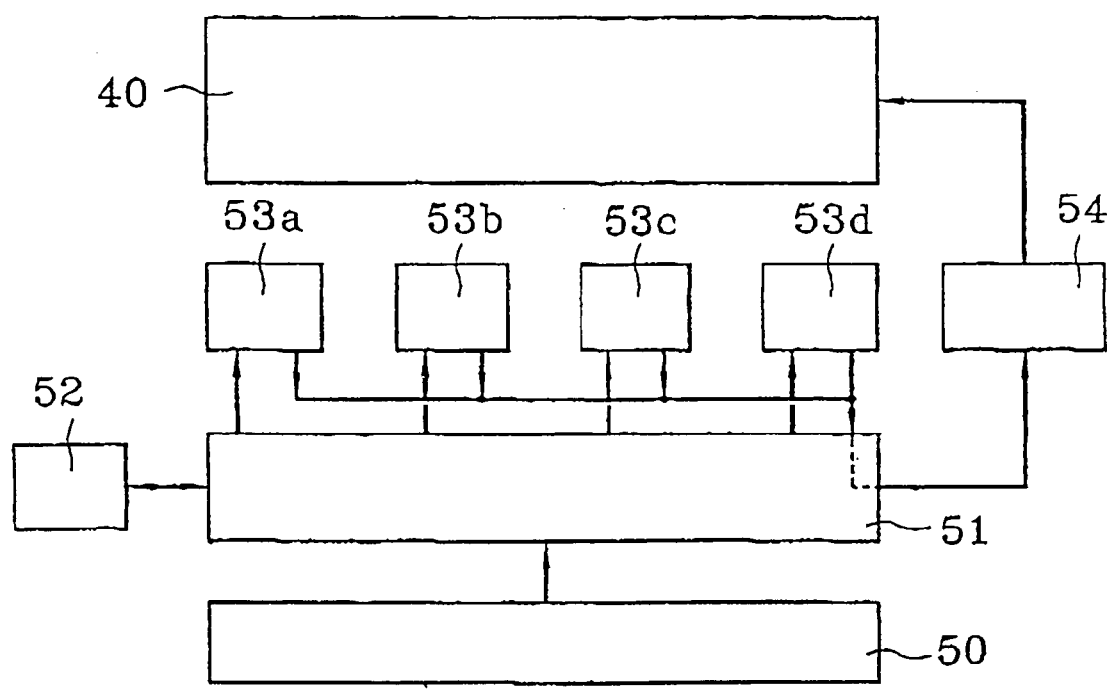

Other particularities and advantages of the invention will emerge clearly from reading the description given by way of a non-restrictive example and in relation to the appended drawings in which:

FIG. 1 already described shows diagrammatically the steps of calling upon a file conversion system, FIG. 2 already described shows diagrammatically the operation of a current file conversion system, FIG. 3 shows diagrammatically a file conversion system according to the invention, FIG. 4 shows diagrammatically the main operational elements of an iCAP flow exchange device according to the invention, FIG. 5 shows diagrammatically an example of an Internet file, FIGS. 6a), 6b), and 6c) show diagrammatically operational elements of a device according to the invention during conversion service call up, the execution of this service and the response respectively, FIG. 7 is a diagram of relationships between classes.

As shown in FIG. 3, the invention consists in providing an adapter 5 preferably in the server 4, so as, on the one hand in the client-server direction, to adapt files so that they may be directly used by the file conversion services 40 and, on the other hand in the server-client direction, to provide a check on the integrity of the converted file and possibly its restoration.

The adapter 5 makes it possible to formalise the exchanges between the iCAP client 3 and the file conversion services-by means of an adaptation of the iCAP flows in steps d) and e) in order to make them compatible with file conversion services 40 without it being necessary to develop an iCAP layer at file conversion service level. This then makes it possible to define file conversion services that are modular, open-ended and independent of the iCAP layers.

The operation of the adapter according to the invention will now be described in relation to FIG. 4:

the adapter 5 is firstly initialised in order particularly to know the conversion service or services that may be called upon: in a configuration file are entered moreover operational parameters (communication port, size of the conversion service request waiting queue, directory where interface files with the server are generated, etc), the names of the conversion services and the specific parameters associated with the conversion services and the way to invoke them (access path, service compilation model (using static or dynamic libraries or executables), etc.); in one embodiment example, the operational parameters were initialised by the following fields and values:

the communication port, server.default_port=8080
the size of the waiting queue, server.default_backlog=20
the directory, server.temp directory=/home/cbe/files
the access path to specific files of a filter service, SVC.def_directory=/home/filtrage/SVC/def since it is initialised, the adapter 5 waits for the iCAP client 3 to connect via a communication module 50 thus allowing it to converse with the iCAP client 3 and to store temporarily all data exchanged during the communication phases.

When file conversion involves a response from the Web server 2, this data shown in FIG. 5 comprises, in addition to a content, the HTTP headers sent from the Web browser of the computer 1, the HTTP headers returned by the destination Web server, as well as the iCAP headers relating to the client 3. When file conversion involves a request, this data comprises the HTTP headers sent from the Web browser of the computer 1, as well as the iCAP headers relating to the iCAP client 3; the other data exists possibly in the event of the conversion being requested after step c) as shown in FIG. 1, but is not involved since it is a request conversion.

Reference is now made to FIG. 4. The module 50 manages the TCP/IP connection and the iCAP protocol in a conventional way by opening particularly a TCP communication port; this module 50 is in wait mode so long as no iCAP request reaches it. When an iCAP request is received, the module sets up a new communication socket responsible for processing the conversion service requested by the client 3; the communication port so released returns to wait mode for another request.

The following written instruction in C++ language in the LINUX operating system may for example be used:

The iCAPAdapter>handleNewClients( );

The data sent by the client 3 is transmitted to a module 500 via the communication socket that has been created. The communication module 50 additionally comprises temporary storage means of all the data exchanged during the communication phases, by means of the module 500, the adapter 5 extracts the headers and the content from the data received from the module 50, analyses the headers, creates four files isolating the different headers from the content, using for example the instruction int iCr+CreateFiles(new_fd,cCanal,Exceed);

after exact shaping the adapter 5 then redirects the data flow to the requested conversion service 40 using for example the instruction if(_ServiceIcap)returnValue-_ServiceIcap
→CallService(new.fd,cCanal,_icapRootDirectory,Exceed);

the service requested 40 may be localised on the server 4 or be remote and invoked through the Internet network for example. The module 500 then puts itself into wait mode for a response from the conversion service;

the converted file returned by the service 40 is checked by the module 500 which verifies its integrity; the converted file will possibly be subject to shaping, or even to a set of additional actions to make it comply with the iCAP protocol;

the checked file is delivered to the iCAP client 3 via the communication module 50 and the communication socket opened to handle this conversion service is closed, using for example the instruction CiCapGlobals::ManageResponse(Filtrage,Long_file,root Directory,socket_fd);.

The diagram shown in FIG. 7 illustrates the relationships existing between the classes used in the previous instructions.

We will now describe in more detail the functionalities of the module 500 in relation to FIGS. 6a), 6b), and 6c)

corresponding to a conversion service call, conversion execution and response respectively.

When a conversion service is called upon, the data is transmitted via the communication module 50 to a header and content extraction module 51. This module 51 separates the different fields specific to each of the headers and invokes the header pre-analysis module 52 for each header.

The header pre-analysis module 52 verifies initially that the conversion service invoked is available on the iCAP server; in the event, it verifies that the conversion service invoked is described in the adapter's configuration file. If this is not the case, it returns an error to the iCAP client 3, via the communication module 50, without passing through the iCAP Server. The module 52 also analyses the iCAP request type: Web response modification or Web request modification. In request modification mode, it is not generally necessary to extract the content or even the HTTP header from the Web server. The module 52 identifies any parameters associated with the execution of the service. The module 52 returns the results to the extraction module 51 which calls on modules 53a, 53b, 53c, 53d to create output interface files.

The modules 53a, 53b, 53c, 53d create the four files offering the file conversion services 40 a common interface, which facilitates the conversions to be carried out on the files:

- the header of the iCAP server 4 is entered into an iCAP-Out file which then contains the information relating to the iCAP client 3 as well as a number of HTTP request or response fields depending on whether it is request modification mode or response modification mode,
- the HTTP header sent by the computer 1 which contains information relating to the client browser as well as to the Web server invoked is entered into an HTTPClient-out file,
- the HTTP header returned by the Web server 2 which contains information relating to the content of the response, its URL address, its type, its length is entered into an HTTPServ-out file; this file may be empty in the case of request modification node;
- the content of the Web server response, expurgated of the headers (html file, gif, jpeg, etc), is entered into an F-Content-Out file; this file may be empty in the case of request modification mode.

Each file name is completed by an index number incremented by one unit at each new iCAP request.

Each file creation module 53a, 53b, 53c, 53d sends a return code to the extraction module 51 to indicate the result of the operation, as well as the names of the files.

Once the headers are analysed and the files created, the extraction module 51 invokes the module 54 for calling up the conversion services 40. This module 54 calls up the relevant conversion service by providing a set of parameters comprising particularly the name of the service call function, the address and the iCAP server port where the service is located and the names of the previously defined interface files.

As shown in FIG. 6b), the conversion service 40 then executes the conversion in relation to modules 53a, 53b, 53c, 53d allowing the interface files to be accessed, and returns the converted data to a response module 55.

Figure 6C:
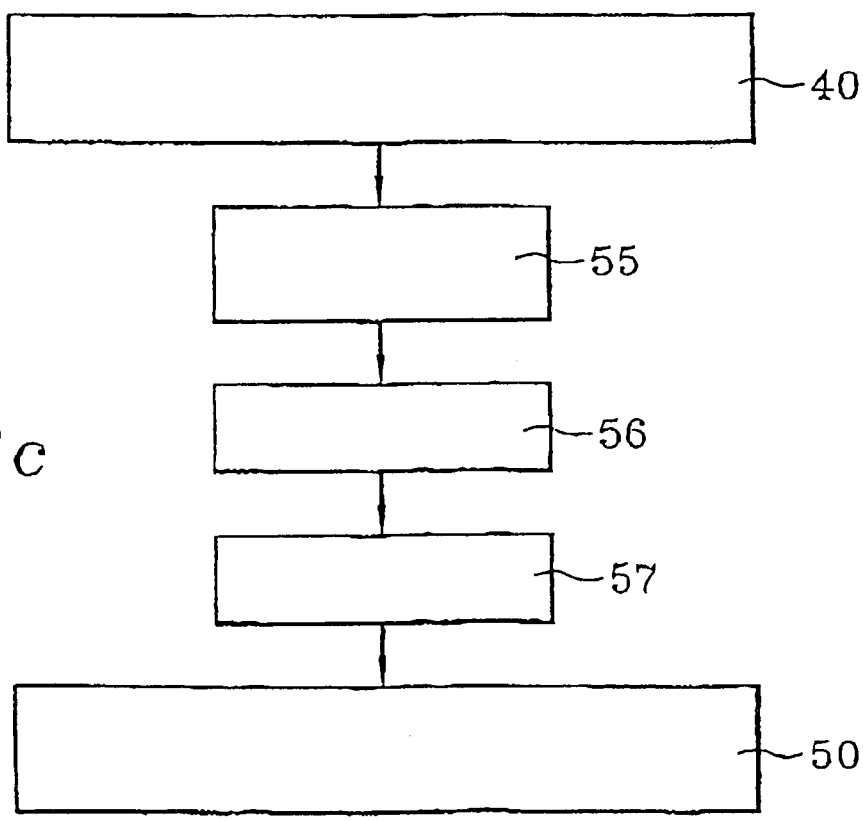

The response module 55 shown in FIG. 6c), recovers the data from the conversion service 40.

Among this data there features a service call function return code indicating that the conversion has been correctly carried out; when this is not the case and a problem has been detected, the return code, which is then an extended error code, allows the response module 55 to make a fast diagnosis of the problem detected.

Among this data there also features additional information in the form of four input interface files corresponding to the output interface files. Each of these files reflects the file conversion that has occurred; the result is:

- an additional modification of the iCAP header,
- possible modifications of the client HTTP header,
- possible modifications of the server HTTP header,
- the data resulting from the converted file.

The response module 55 may use these files to call up a new iCAP service and thus link the conversion services together in so far as the data and parameters are available and already listed in the directory. This functionality may be activated when the services to be linked together have the same generic name.

A virus checking service may for example follow a "parental" control service preventing access to Web pages for which licentious topics have been detected, these two services being recognised under the generic name "control".

After receiving the converted data, the response module 55 invokes the integrity check module 56.

The module 56 verifies the integrity of the data by carrying out particularly coherence tests between for example the length of the converted file and the header information relating to this length.

The checked data is then sent to the file restoration module 57.

The module 57 creates or completes the iCAP header with the information on the nature of the iCAP server 4. It modifies the HTTP headers of the computer 1 and/or of the Web server 2 as a function of the data in the integrity check module 56; in the event of the absence of one or more input interface files, the module 57 may recreate them from the output interface files.

Once restored, the file is transmitted to the communication module 50, which returns it to the iCAP client 3 who has initialised the iCAP request.

The invention claimed is:

1. An adapter for adapting Internet content adaptation protocol (ICAP) type data flows to files adapted to be used directly by a server or a client device, the adapter enabling a formalization of data flow exchanges between the client device having an Internet file and the server adapted to ensure, on request from the client device, at least one conversion service for converting said file, the formalization of the data flow exchanges enabling the at least one conversion service of the server to be implemented independent of an ICAP layer, the adapter comprising means for communicating with the client device and the server and a configuration file in which the at least one conversion service is declared.

2. The adapter of claim 1, further comprising a communication module to manage communication with the client device.

3. The adapter of to claim 1, further comprising a module for extracting one or more headers and content of the Internet file.

4. The adapter of claim 3, further comprising a header pre-analysis module.

5. The adapter of claim 1, further comprising at least one module for creating interface files between the adapter and the server.

6. The adapter of claim 1, further comprising a module for calling up the at least one file conversion service of the server.

7. The adapter of claim 1, further comprising a response module.

8. The adapter of claim 1, further comprising a module for checking the integrity of a converted file intended for the client device.

9. The adapter of claim 1, further comprising a module for restoring a converted file intended for the client device.

10. The adapter of claim 1, wherein the adapter is integrated with the server.

11. A method for exchanging data flows between a client device having an Internet file and a server adapted to ensure at least one file conversion service, the communication between the client device and the server being based on an Internet file content adaptation protocol (ICAP, the method comprising:
    receiving, by an adapter in communication with both said client device and said server, an Internet file from said client;
    adapting, by said adapter, the Internet file to generate an adapted file, the adapting of the Internet file allowing formalization of data flow exchanges between the client device and the server, wherein the formalization on the data flow exchanges enable the at least one conversion service of the server of the server to be impemented independent of an ICAP layer;
    sending, by said adapter, the adapted file to said server for conversion by the at least one file conversion service;
    receiving, by said adapter, a converted file from said server, the converted file resulting from a conversion of the adapted file;
    adapting, by said adapter, the converted file to generate a converted and adapted file; and
    sending, by said adapter, the converted and adapted file to said client device.

12. The method of claim 11, wherein adapting the Internet file comprises:
    extracting one or more headers of the Internet file;
    pre-analysing the extracted one or more headers;
    generating interface files;
    calling the at least one file conversion service of said server; and
    awaiting a response from said server.

13. The method of claim 11, wherein adapting the converted file comprises:
    verifying a call return parameter and checking an integrity of the converted file; and
    restoring the converted file following the integrity check.

14. The method of claim 11, further comprising:
    initializing said adapter by declaring the conversion service or services in a configuration file of said adapter.

15. The method of claim 11, wherein adapting the Internet file further comprises:
    extracting content of the Internet file.

* * * * *